(12) United States Patent
Elsasser et al.

(10) Patent No.: US 10,967,571 B1
(45) Date of Patent: Apr. 6, 2021

(54) VARYING ORIFICE CROSS-SECTION FOR THREE-DIMENSIONAL PRINTING

(71) Applicant: INTERNATIONAL BUSINESS MACHINES CORPORATION, Armonk, NY (US)

(72) Inventors: Ryan Elsasser, Poughkeepsie, NY (US); Suraush Khambati, Poughkeepsie, NY (US); Noah Singer, White Plains, NY (US); Khaalid Persaud Juggan McMillan, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/666,711

(22) Filed: Oct. 29, 2019

(51) Int. Cl.
  *B29C 64/209* (2017.01)
  *B29C 64/321* (2017.01)
  *B29C 64/227* (2017.01)
  *B29C 64/295* (2017.01)
  *B33Y 30/00* (2015.01)
  *B29C 64/118* (2017.01)

(52) U.S. Cl.
  CPC .......... *B29C 64/209* (2017.08); *B29C 64/227* (2017.08); *B29C 64/295* (2017.08); *B29C 64/321* (2017.08); *B29C 64/118* (2017.08); *B33Y 30/00* (2014.12)

(58) Field of Classification Search
  None
  See application file for complete search history.

(56) References Cited

U.S. PATENT DOCUMENTS

| | | | | |
|---|---|---|---|---|
| 3,264,685 A | * | 8/1966 | Boggild | B29C 48/12 425/183 |
| 4,569,815 A | * | 2/1986 | Rentz | A63H 33/001 264/310 |
| 9,073,366 B1 | * | 7/2015 | Din | B33Y 30/00 |
| 9,278,536 B2 | * | 3/2016 | Din | B41J 2/16544 |
| 9,446,558 B2 | * | 9/2016 | Chang | B29C 64/393 |
| 10,016,929 B2 | | 7/2018 | Wang et al. | |
| 10,150,239 B2 | * | 12/2018 | Ryan | B29C 48/92 |
| 10,232,443 B2 | | 3/2019 | Myerberg et al. | |

(Continued)

FOREIGN PATENT DOCUMENTS

| | | |
|---|---|---|
| CN | 106493940 A | 3/2017 |
| CN | 104085111 B | 4/2017 |

(Continued)

*Primary Examiner* — Xiao S Zhao
*Assistant Examiner* — Emmanuel S Luk
(74) *Attorney, Agent, or Firm* — Cantor Colburn LLP; Tihon Poltavets (57) ABSTRACT

Systems for varying orifice cross-section for 3D printing are provided. Aspects of the invention include an actuator operable to control an actuator rod, a plurality of nozzles connected to the actuator rod, the plurality of nozzles comprising a first nozzle and a second nozzle, wherein the first nozzle comprises a first cross-section, wherein the second nozzle comprises a second cross-section, and a controller configured to operate the actuator rod to maneuver the first nozzle under a printer head, wherein the printer head extrudes a filament that passes through the first cross-section of the first nozzle.

14 Claims, 7 Drawing Sheets

(56) References Cited

U.S. PATENT DOCUMENTS

| | | | | |
|---|---|---|---|---|
| 2005/0015173 A1* | 1/2005 | Ohmori | ............... | B33Y 40/00 |
| | | | | 700/119 |
| 2015/0140147 A1* | 5/2015 | Konstantinos | ........ | B29C 64/106 |
| | | | | 425/131.1 |
| 2016/0046073 A1 | 2/2016 | Hadas | | |
| 2016/0193778 A1* | 7/2016 | Lee | ............... | B29C 64/364 |
| | | | | 425/378.1 |
| 2016/0288395 A1* | 10/2016 | Shen | ............... | B29C 48/92 |
| 2017/0144375 A1* | 5/2017 | Waldrop, III | ............ | B26D 1/46 |
| 2017/0173884 A1 | 6/2017 | Ryan | | |
| 2017/0320272 A1* | 11/2017 | Mantell | ............... | B29C 64/209 |
| 2019/0210264 A1* | 7/2019 | Jenzen | ............... | B29C 49/6418 |

FOREIGN PATENT DOCUMENTS

| | | | |
|---|---|---|---|
| CN | 107042632 A | 8/2017 | |
| CN | 108556348 A | 9/2018 | |
| KR | 101430582 B1 | 8/2014 | |

* cited by examiner

VARYING ORIFICE CROSS-SECTION FOR THREE-DIMENSIONAL PRINTING

BACKGROUND

The present invention generally relates to three-dimensional (3D) printing, and more specifically, to varying orifice cross-section for 3D printing.

3D printing, or additive manufacturing, is a process of making a three-dimensional solid object of virtually any shape from a digital model. 3D printing is achieved using an additive process, where successive layers of material are laid down in different shapes. 3D printing is also considered distinct from traditional machining techniques, which mostly rely on the removal of material by methods such as cutting or drilling (subtractive processes). Once a three-dimensional model is created, the 3D printer can create copies of the digital object. 3D printers offer low cost and quick turnover from design to production when compared to other forms of manufacturing, such as molding or milling. Such low barriers of entry have increased the variety of objects being manufactured in addition to those who would produce the objects.

SUMMARY

Embodiments of the present invention are directed to a system for varying orifice cross-sections for three-dimensional printing. A non-limiting example of the system includes an actuator operable to control an actuator rod, a plurality of nozzles connected to the actuator rod, the plurality of nozzles comprising a first nozzle and a second nozzle, wherein the first nozzle comprises a first cross-section, wherein the second nozzle comprises a second cross-section, and a controller configured to operate the actuator rod to maneuver the first nozzle under a printer head, wherein the printer head extrudes a filament that passes through the first cross-section of the first nozzle.

Embodiments of the present invention are directed to a system for varying orifice cross-sections for three-dimensional printing. A non-limiting example of the system includes an actuator operable to control a plurality of actuator rods, the plurality of actuator rods comprising a first actuator rod and a second actuator rod, a plurality of nozzles connected to each actuator rod in the plurality of actuator rods, the plurality of nozzles comprising a first nozzle and a second nozzle, wherein the first nozzle is connected to the first actuator rod, wherein the first nozzle comprises a first cross-section, wherein the second nozzle is connected to the second actuator rod, wherein the second nozzle comprises a second cross-section, and a controller configured to operate the first actuator rod to maneuver the first nozzle under a printer head, and operate the second actuator rod to maneuver the second nozzle under the first nozzle, wherein the printer head extrudes a filament that passes through the first cross-section of the first nozzle and the second cross-section of the second nozzle.

Embodiments of the present invention are directed to a system for varying orifice cross-sections for three-dimensional printing. A non-limiting example of the system includes a spindle operable to control a rotary disk, a plurality of nozzles disposed in the rotary disk, the plurality of nozzles comprising a first nozzle and a second nozzle, wherein the first nozzle comprises a first cross-section, wherein the second nozzle comprises a second cross-section, a controller configured to operate the spindle to maneuver the first nozzle under a printer head, wherein the printer head extrudes a filament that passes through the first cross-section of the first nozzle.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

A typical 3D printer includes a moving head into which a plastic filament is fed. This passes over a heating mechanism and is forced through a nozzle which is formed, for example, of a metal or metal alloy such as brass. The nozzle is typically a circular orifice which deposits a thread. The moving head is usually computer controlled. Computer software executing on the computer typically translates a digital design into the required head movements to build up a three-dimensional object by successive thread deposition.

The material used in 3D printers typically includes one or more plastics materials, typically thermoplastics, and particularly acrylonitrile butadiene styrene (ABS). Other thermoplastics which have been used successfully include nylon, polystyrene and polylactic acid (PLA).

As mentioned above, the digital designs utilized for the 3D printer head movements can vary across a wide array of applications of the finalized printed objects. These digital designs may require adjustments to the nozzle orifice of the printer head to achieve the desired characteristics of the printed objects. For example, the thickness of the filament output from the nozzle is limited to a fixed output. For any adjustments to this thickness (or other characteristics, such as shape) the nozzle mush be changed manually which involves user intervention and stoppage of the 3D printer. In addition, the nozzles have a defined lifetime which may be less than the time taken to complete a print job for the 3D printer. This can be problematic since the 3D printer would need to be taken offline to change the nozzle and the object characteristics would be affected by essentially pausing a printing job.

One or more embodiments of the present invention provide a variable nozzle orifice to produce filament output of varying cross-sections and sizes. The variable nozzle orifice is achieved utilizing multiple nozzles mounted near the printer head that can be interchanged as needed without stopping or pausing the print job for a long period of time. These mounted nozzles can include orifices of varying sizes and cross-sections to allow for changes in the filament size through the orifice of the nozzle. In one or more embodiments of the invention, the multiple nozzles can be mounted on one or more actuator rods that can quickly change the nozzle for the printer head as required for each printing job. The actuator rod can be controlled by an actuator which can operate the actuator rod in a linear movement, for example, to arrange the nozzles such that the size and shape of the output of the nozzle changes. This actuator rod can be operated by a processor or a controller. The nozzles include an inlet and an outlet (e.g., orifice). For the inlet, the nozzle interfaces with the heating chamber of the printer head. The heating chamber is the chamber where the plastic filament is maintained in a fluid state. In addition, the heating chamber also provides heat to the nozzle to avoid the potential for clogging the nozzle. On the outlet side, the orifice varies in size and shape depending on which nozzle is in place. The size can be representative of the printing pixel size. In some embodiments, the nozzle can be utilized in conjunction with a flow control valve or a feed-in device that controls the flow rate of the plastic filament based on the nozzle used. A control algorithm can be used for nozzle adjustment to integrate into the printer head path.

Figure 1:
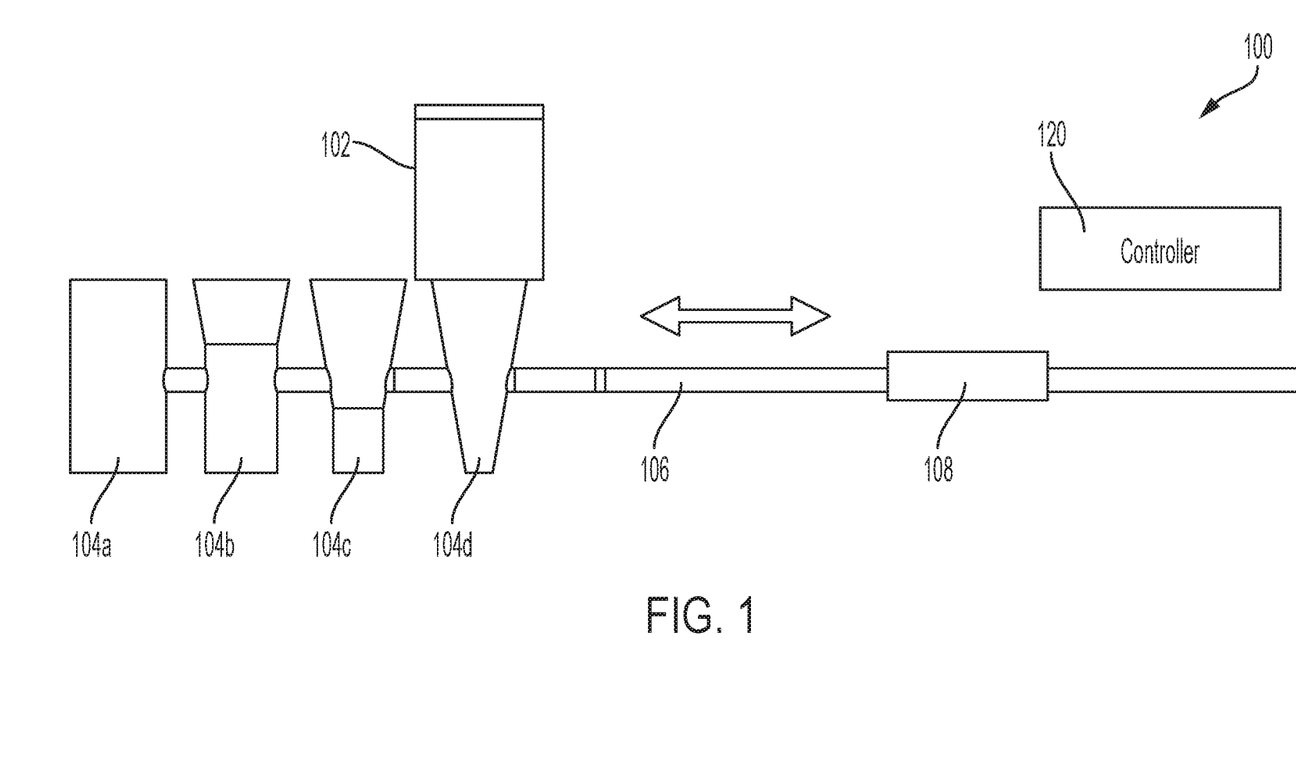
FIG. 1 depicts a diagram of a system for varying orifice cross-sections for three-dimensional printing according to one or more embodiments of the invention.

FIG. 1 depicts a diagram of a system for varying orifice cross-sections for three-dimensional printing according to one or more embodiments of the invention. The system 100 includes a printer head 102. The printer head 102 can be for a three-dimensional printing application and include a filament feeding apparatus and a heating chamber to avoid the potential for clogging. The system 100 also includes a number of nozzles 104a-d, an actuator rod 106, and an actuator 108. The actuator 108 can be controlled by a controller 120. While the illustrated example includes a total of four nozzles 104a-d, more or fewer nozzles can be utilized for the system 100 described herein. In one or more embodiments, the controller 120 can control the actuator 108 to allow the nozzles 104a-d to be maneuvered underneath the print head 102 so that the cross-section (sometimes referred to as orifices) can be varied during utilization of the print head 102. In one or more embodiments of the invention, the print head 102 can be a print head in a 3D printer wherein a filament output is produced from the print head and fed through the nozzle cross-sections based on the printing job. As briefly mentioned above, the controller 120 can control the width and shape of the filament from the print head 102 by maneuvering the nozzles (each having varying width and shaped cross-sections) underneath the print head 102. For example, nozzle 104d includes a narrower cross-section (i.e., orifice) than the other nozzles 104a-c. For a printing application that requires a narrower filament feed, the controller 120 can operate the actuator 108 to maneuver the actuator rod 106 and connected nozzles 104a-d such that nozzle 104d is positioned underneath the print head 102 and filament can flow through the opening of nozzle 104d. In addition, the controller 120 further operates the actuator 108 and actuator rod 108 to keep the nozzle 104d underneath the print head 102 as the print head 102 moves to perform a printing job. That is to say, the nozzle 104d moves with the print head 102 linearly along the actuator rod 106. In one or more embodiments of the invention, the controller 120 can be the print controller that also controls the print head 102. In other embodiments of the invention, the controller 120 can be a different controller than the print controller and controls only the actuator 108.

Figure 2:
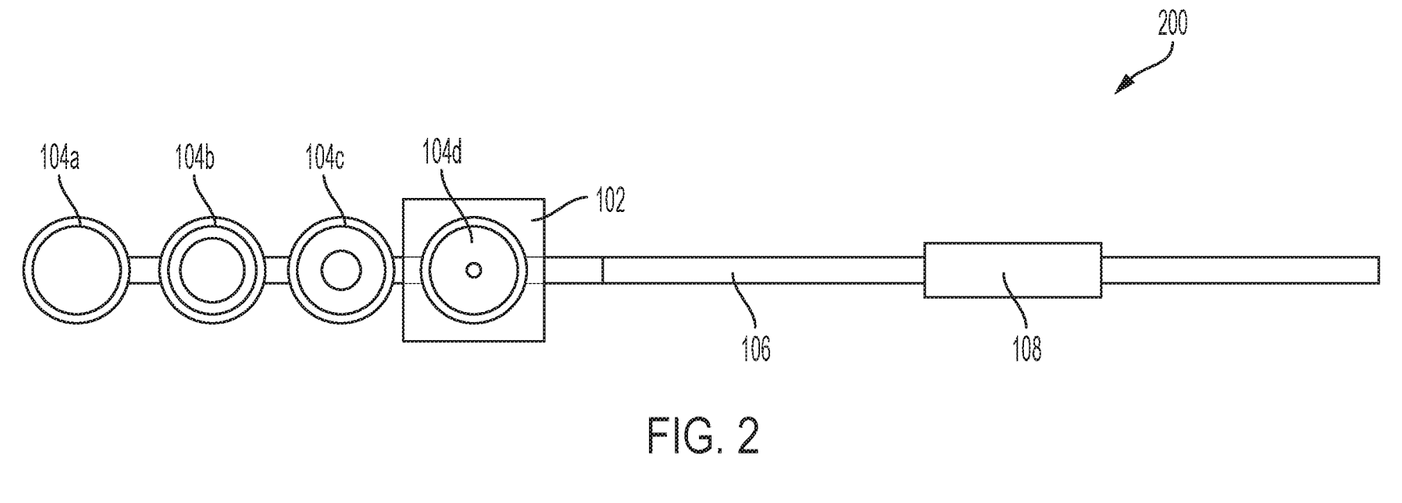
FIG. 2 depicts a top down view of the nozzles, actuator rod, and actuator according to one or more embodiments of the invention.

FIG. 2 depicts a top down view of the nozzles 104a-d, actuator rod 106, and actuator 108 according to one or more embodiments of the invention. The top down view 200 includes the components from the system 100 in FIG. 1. As mentioned above, the nozzles 104a-d include varying cross-sections (i.e., orifices) to allow filament from the print head 102 to flow through and vary the size (and shape) of the filament being utilized for a printing job. In the illustrated example, nozzle 104d which includes the narrowest output cross-section is positioned underneath the print head 102 by the actuator 108 to allow a narrower filament size to pass through as compared to the other nozzles 104a-c.

Figure 3:
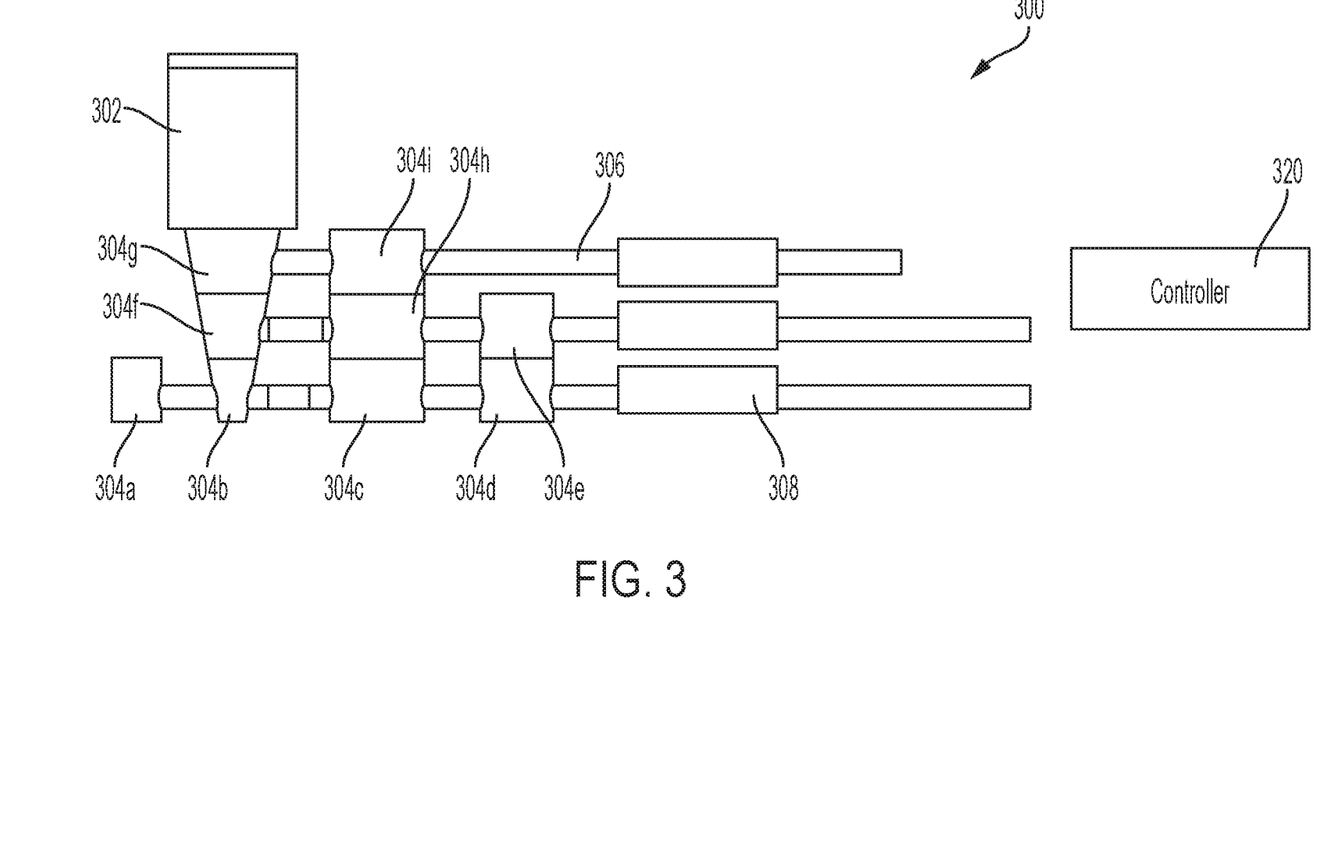
FIG. 3 depicts a diagram of a system for varying orifice cross-sections for three-dimensional printing according to one or more embodiments of the invention.

FIG. 3 depicts a diagram of a system for varying orifice cross-sections for three-dimensional printing according to one or more embodiments of the invention. The system 300 includes a printer head 302. The printer head 302 can be for a three-dimensional printing application and include a filament feeding apparatus and a heating chamber for heating the filament. The system 300 also includes a plurality of actuator rods 306 being controlled by a plurality of actuators 308. The actuators 308 can be controlled by a controller 320. In one or more embodiments of the invention, the actuator rods 306 can have a plurality of nozzles layers. Each nozzle layer includes one or more nozzles 304a-i attached to each actuator rod 306. As described above, the output of the filament being fed through the print head 302 can be varied by maneuvering one or more of the nozzles 304a-i underneath the print head 302 which allows the filament to flow through the orifices in the nozzles 304a-i. As shown in the illustrated example, the nozzles 304a-i can be maneuvered and combined to form output cross-sections that match the requirements of a printing job. For example, nozzles 304b, 304f, and 304g are being utilized to create an output orifice with a wide orifice at the top of the final nozzle utilizing nozzle 304g. The final nozzle then has a narrowing orifice created utilizing nozzle 304f and 304b to create the required output for the printing jobs. The remaining nozzles 304a-c, 304e, and 304h-i can be maneuvered as well to form any combination of final nozzles in combination with nozzles 304b and 304f-g as required be a printing job.

In one or more embodiment of the invention, the multiple nozzles can be mounted on one or more rotary turrets that can be affixed near the printer head to allow for the quick interchange of nozzles and thus change the orifice by which the filament passes through. These nozzles can include orifice cross-sections of varying size and shape to control the passing of filament from the print head to complete a printing job for a 3D printer. The nozzles can be disposed within the one or more rotary turrets and the rotary turret can be rotated to position one or more nozzles underneath the print head to allow filament to pass through. The rotary turret can be controlled by a rotary spindle that can be controlled by a controller utilizing a control algorithm for nozzle adjustment to integrate into the printer head path for the filament. A heating element can be integrated with the rotary turret to provide heat to the nozzles to avoid the potential for clogging.

Figure 4:
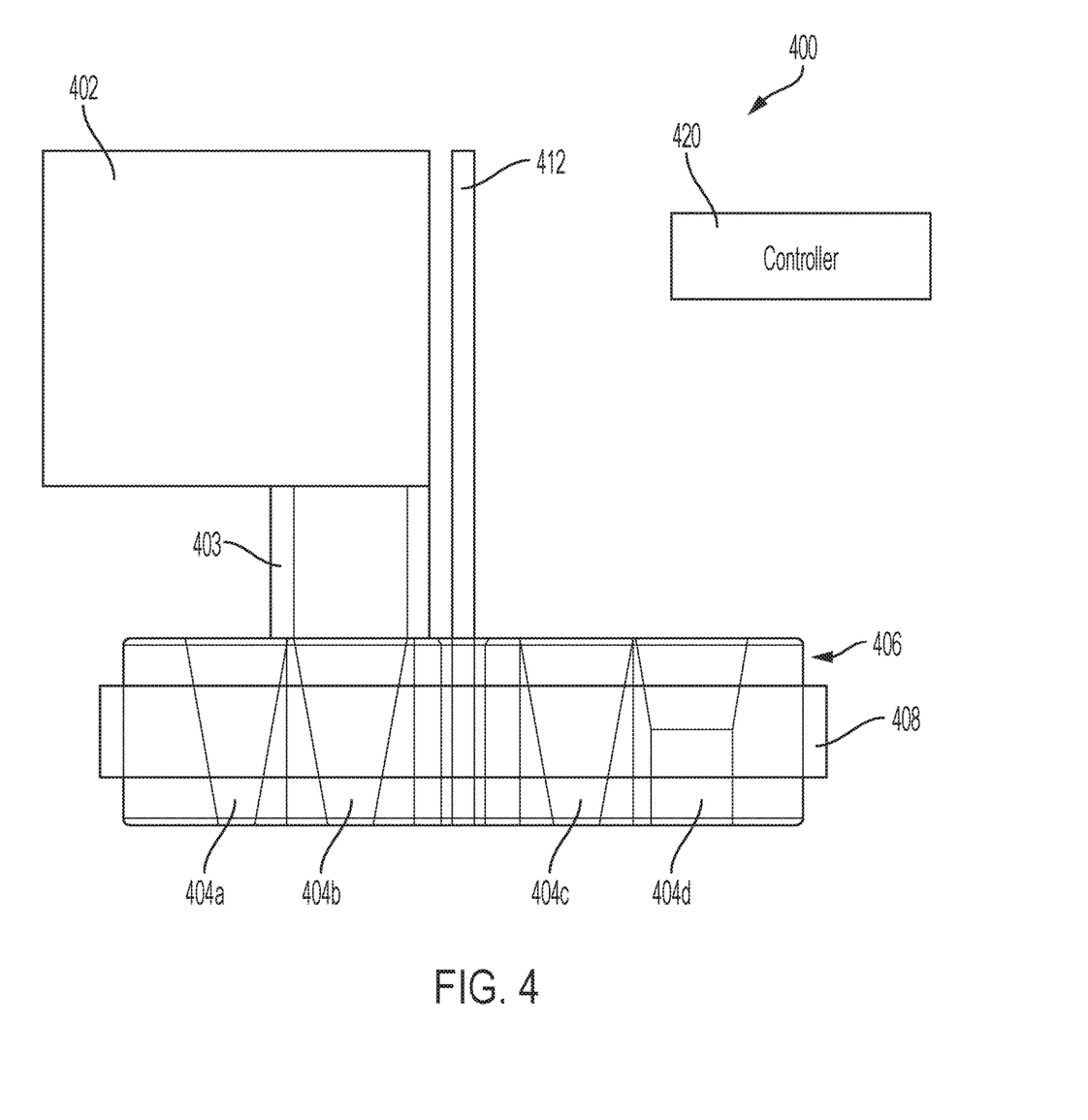
FIG. 4 depicts a diagram of a system for varying orifice cross-sections for three-dimensional printing according to one or more embodiments of the invention.

FIG. 4 depicts a diagram of a system for varying orifice cross-sections for three-dimensional printing according to one or more embodiments of the invention. The system 400 includes a print head 402 and a feeder 403. The print head 402 and/or feeder 404 can include a heating chamber for heating filament utilized in the three-dimensional printing process. The system 400 also includes a rotary turret 406 that includes a plurality of nozzles 404*a-d* within the rotary turret 406 (sometimes referred to as a "rotary disk"). The plurality of nozzles 404*a-d* have varying cross-section sizes and shapes that allow for filament from the print head 402 and the feeder 403 to pass through orifices in the nozzles 404*a-d*. The rotary turret 406 can rotate around the rotary spindle 412 such that the nozzles 404*a-d* can be maneuvered to be underneath the print head 402. In one or more embodiment of the invention, the system 400 also includes a circular heating element 408 that allows for heat to be provided to the rotary turret 406 and the nozzles 404*a-d*. As mentioned above, the nozzles 404*a-d* are heated to avoid the potential for clogging the nozzles. The system 400 also includes a controller 420 that can operate the rotary spindle 412 and thus the rotary turret 406 to maneuver the various nozzles 404*a-d* underneath the print head 402 as needed for different printing jobs.

In one or more embodiments of the invention, the system 400 can include more than one rotary turret with a plurality of nozzles disposed within each rotary turret. The nozzles can be rotated to form output orifices for the print head and feeder depending on the requirements of a printing job. The rotation of the nozzles can be performed by the controller 420 from FIG. 4. In some embodiments of the invention, the different nozzles are housed within the rotary turret 406 and cannot be rotated independently. The turret when rotated about the rotary spindle 412 can control the position of which nozzle lines up with the feeder 403, hence effecting the desired output by controlling the orifice size.

Figure 5:
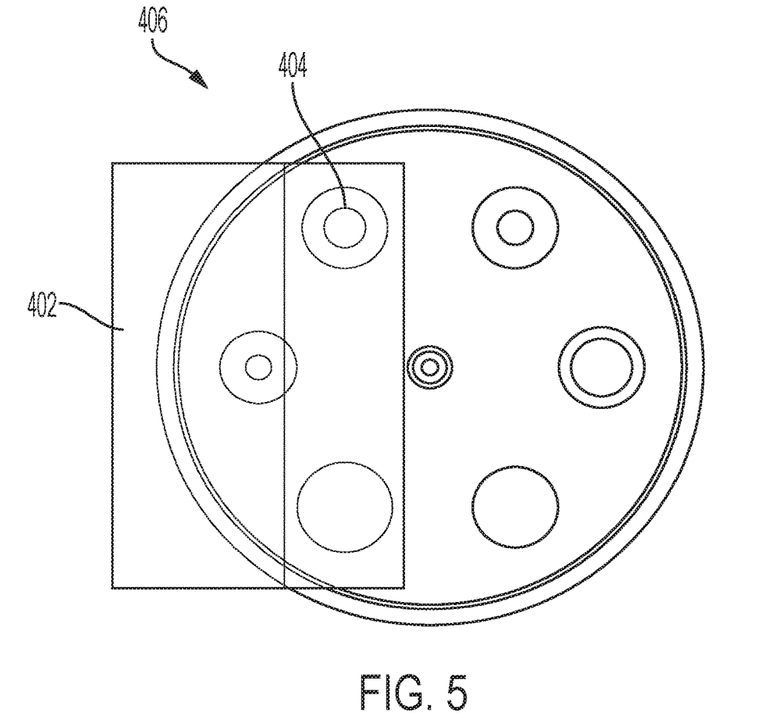
FIG. 5 depicts a top down view of the rotary turret and nozzles according to one or more embodiments of the invention.

FIG. 5 depicts a top down view of the rotary turret and nozzles according to one or more embodiments of the invention. As shown in the illustrated example, the rotary turret 406 includes a plurality of nozzles 404 within the rotary turret 404 such that when the rotary turret 406 rotates, the nozzles 404 also rotate allowing the nozzles 404 to be positioned underneath the print head 402. The plurality of nozzles 404 have varying cross-section orifices that allows for the change in flow of filament from the print head 402 for the printing job.

Figure 6:
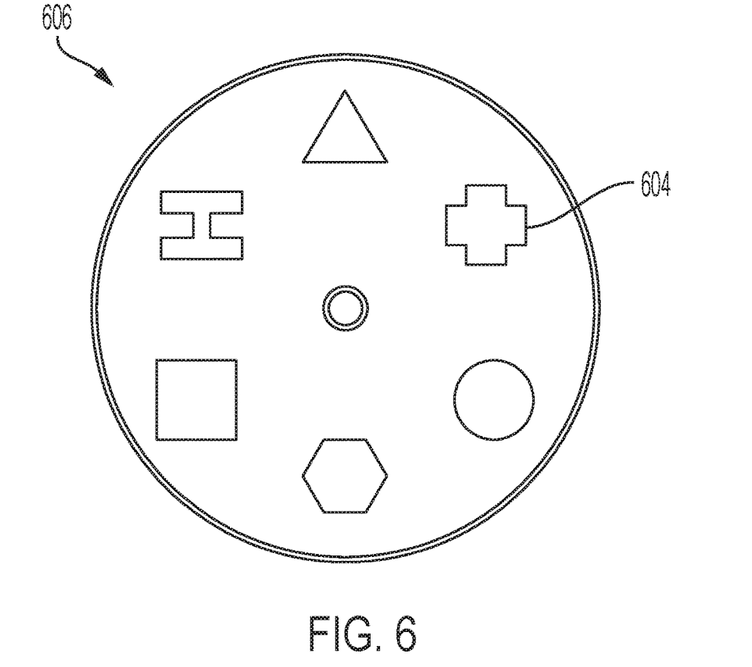
FIG. 6 depicts a top down view of the rotary disk and various nozzle shapes for the cross-section orifices according to one or more embodiments of the invention.

FIG. 6 depicts a top down view of the rotary disk and various nozzle shapes for the cross-section orifices according to one or more embodiments of the invention. The rotary turret 606 includes a plurality of nozzles heads 604 disposed within the rotary disk 606. The nozzles heads 604 can have various shapes at the output of the nozzle. For example, the illustrated example includes H-shaped outputs, triangle shaped outputs, and plus shaped outputs. The various nozzles heads 604 can be selected based on the requirements for a 3D printing job and can be interchangeable during the printing job by rotating the rotary disk 606 and the nozzles heads 604 under the rotary turret and the print head, for example.

Figure 7A:
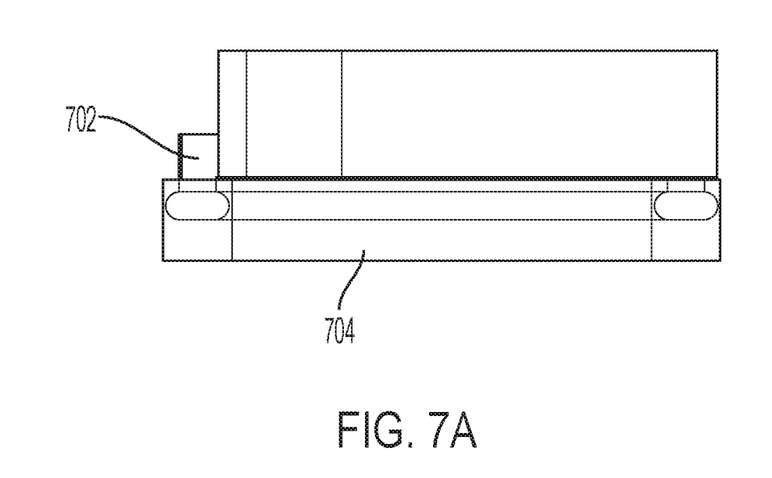
FIG. 7a depicts a side view and an isometric view of the feeder attached to the rotary turret using a rotary rail according to one or more embodiments of the invention.

FIG. 7*a* depicts a side view and an isometric view of the feeder 403 attached to the rotary turret using a rotary rail according to one or more embodiments of the invention. The feeder 403 can be connected to the rotary turret by way of a rotary rail 704 disposed on the rotary turret. The feeder can be connected to the rotary turret utilizing any means including, but not limited to, one or more t-engagements 702. The t-engagement 702 allows the feeder 403 to be secured to the rotary turret to also allow for the feeder 403 to rotate along with the rotary turret. In addition, one or more sealing mechanisms can be utilized to seal the feeder 403 with the rotary turret and the nozzles to reduce the potential for leakage of the filament and provide for continuous positive retention.

Figure 7B:
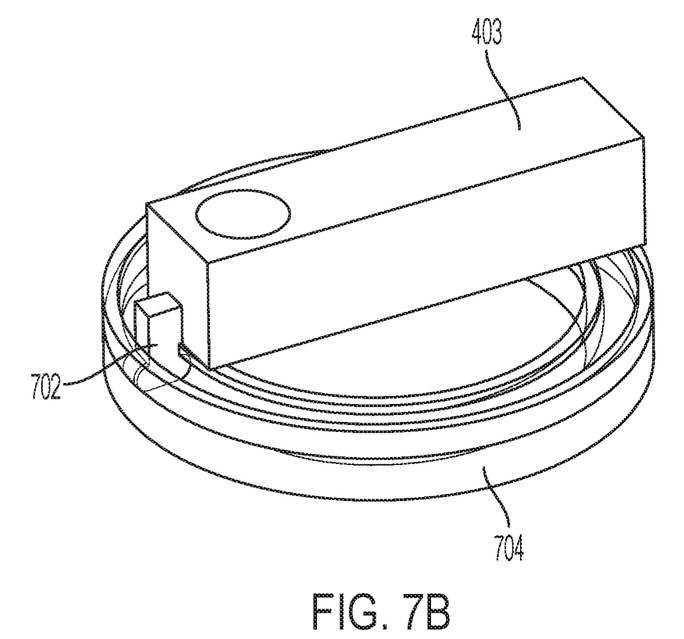
FIG. 7b depicts an isometric view of the feeder attached to the rotary turret using a rotary rail according to one or more embodiments of the invention.

FIG. 7*b* depicts an isometric view of the feeder 403 attached to the rotary turret using a rotary rail according to one or more embodiments of the invention. The feeder 403 is secured to the rotary rail 704 utilizing a t-engagement 702. The rotary rail 704 is connected to the rotary turret. The rotary turret 406 has the heating element 408 around it, and, mechanically fastened or press fit to the exterior (circumference) of this is the rotary rail 704. The T-engagement 702 fits within the rotary rail 704, thereby providing a positive retention between the feeder 403 and the nozzles on the rotary turret 406. As mentioned above, the rotary turret 406 is in turn controlled by a single rotary spindle 412.

Figure 8:
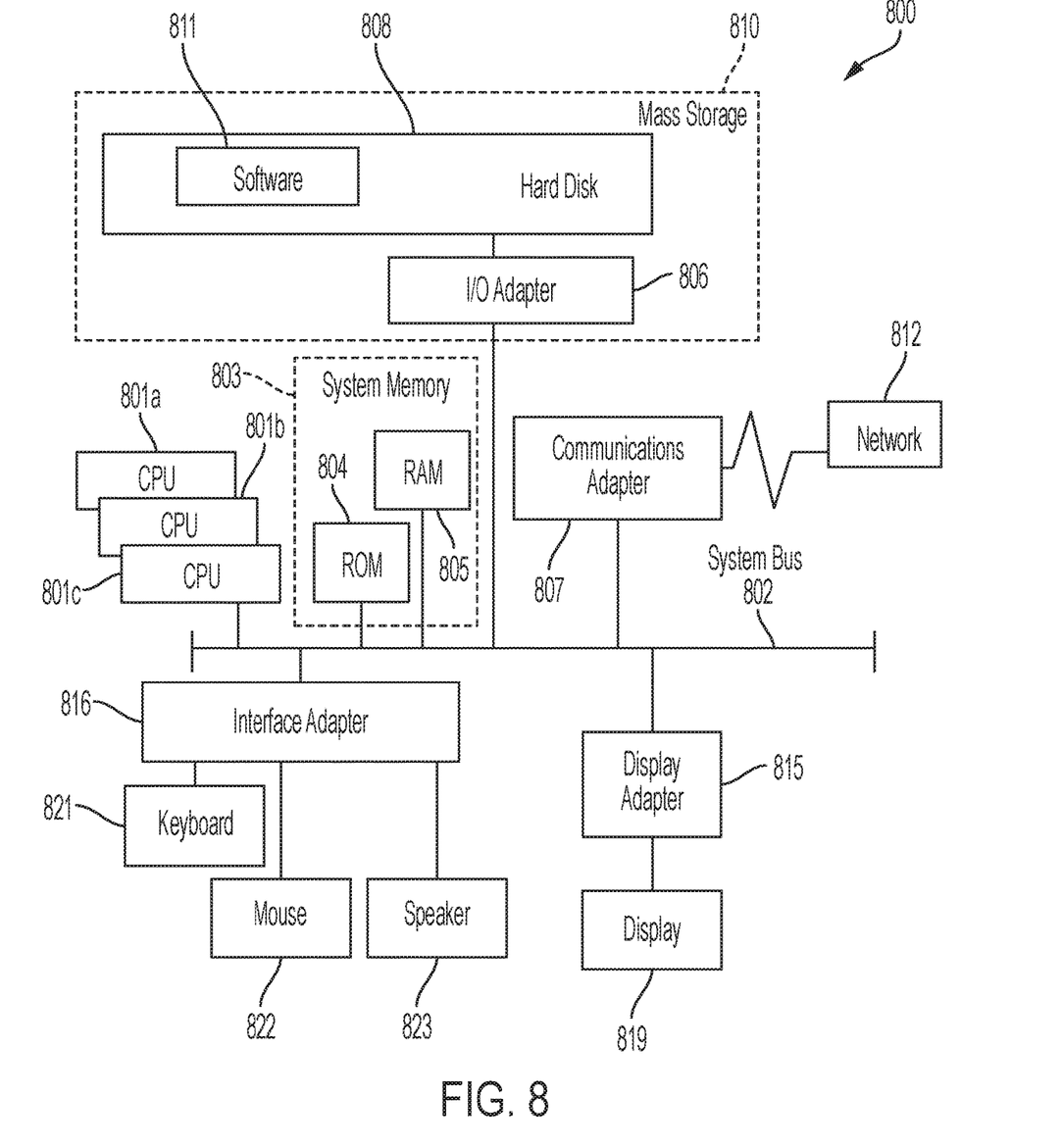
FIG. 8 depicts a computer system in accordance with an embodiment.

In one or more embodiments of the invention, any of the controllers 120, 320, and 420 can be implemented on the processing system 800 found in FIG. 8.

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801*a*, 801*b*, 801*c*, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
   an actuator operable to control a plurality of actuator rods, the plurality of actuator rods comprising a first actuator rod and a second actuator rod;
   a plurality of nozzles connected to each actuator rod in the plurality of actuator rods, the plurality of nozzles comprising a first nozzle and a second nozzle;
   wherein the first nozzle is connected to the first actuator rod;
   wherein the first nozzle comprises a first cross-section;
   wherein the second nozzle is connected to the second actuator rod;
   wherein the second nozzle comprises a second cross-section; and
   a controller configured to:
     operate the first actuator rod to maneuver the first nozzle under a printer head; and
     operate the second actuator rod to maneuver the second nozzle under the first nozzle, wherein the printer head extrudes a filament that passes through the first cross-section of the first nozzle and the second cross-section of the second nozzle.

2. The system of claim 1, wherein the plurality of nozzles further comprises a third nozzle connected to the second actuator rod; and
   wherein the third nozzle comprises a third cross-section;
   wherein the controller is further configured to:
     operate the second actuator rod to maneuver the third nozzle under the first nozzle, wherein the printer head extrudes the filament that passes through the first cross-section of the first nozzle and the third cross-section of the third nozzle.

3. The system of claim 1, wherein the first cross-section is larger than the second cross-section.

4. The system of claim 1, further comprising a heating element configured to provide heat to at least one nozzle in the plurality of nozzles.

5. The system of claim 1, wherein the filament comprises a thermoplastic.

6. A system comprising:
   a spindle operable to control a rotary disk;
   a plurality of nozzles disposed in the rotary disk, the plurality of nozzles comprising a first nozzle and a second nozzle;
   wherein the first nozzle comprises a first cross-section;
   wherein the second nozzle comprises a second cross-section;
   a second rotary disk;
   a plurality of shaped orifices disposed within the second rotary disk, the plurality of shaped orifices comprising a first shaped orifice and a second shaped orifice:
     wherein the first shaped orifice comprises a first shaped cross-section;
     wherein the second shaped orifice comprises a second shaped cross-section;
   a controller configured to:
     operate the spindle to maneuver the first nozzle under a printer head, wherein the printer head extrudes a filament that passes through the first cross-section of the first nozzle; and
     operate the second rotary disk to maneuver the first shaped orifice under at least one nozzle in the plurality of nozzles.

7. The system of claim 6, wherein the controller is further configured to:

operate the spindle to maneuver the second nozzle under the printer head, wherein the printer head extrudes the filament that passes through the second cross-section of the second nozzle.

8. The system of claim 6 further comprising a heating element coupled to the rotary disk, the heating element operable to provide heat to at least one nozzle in the plurality of nozzles.

9. The system of claim 6 further comprising:
a feeder element, wherein the feeder element is operable to connect an output of the printer head to at least one nozzle in the plurality of nozzles.

10. The system of claim 9 further comprising:
a rotary rail on the rotary disk, wherein the feeder element is coupled to the rotary rail.

11. The system of claim 10, wherein the feeder element is coupled to the rotary rail by one or more T-shaped couplings.

12. The system of claim 6, wherein the controller is further configured to:
operate the second rotary disk to maneuver the second shaped orifice under at least one nozzle in the plurality of nozzles.

13. The system of claim 6, wherein the first cross-section is larger than the second cross-section.

14. The system of claim 6, wherein the filament comprises a thermoplastic.

* * * * *